(12) United States Patent
Ripploh et al.

(10) Patent No.: US 12,269,318 B2
(45) Date of Patent: Apr. 8, 2025

(54) MULTI-SPLIT HVAC SYSTEMS

(71) Applicant: ContiTech Techno-Chemie GmbH, Karben (DE)

(72) Inventors: Peter Ripploh, Copley, OH (US); Markus Linzmaier, Neustetten (DE)

(73) Assignee: ContiTech Techno-Chemie GmbH, Karben (DE)

( * ) Notice: Subject to any disclaimer, the term of this patent is extended or adjusted under 35 U.S.C. 154(b) by 0 days.

(21) Appl. No.: 17/822,755

(22) Filed: Aug. 26, 2022

(65) Prior Publication Data

US 2024/0066955 A1 Feb. 29, 2024

(51) Int. Cl.
*B60H 1/32* (2006.01)

(52) U.S. Cl.
CPC ......... *B60H 1/3205* (2013.01); *B60H 1/3228* (2019.05)

(58) Field of Classification Search
CPC .... B60H 1/3205; B60H 1/3228; Y02B 30/00; Y02B 30/52; Y02B 30/70; Y02T 90/00
See application file for complete search history.

(56) References Cited

U.S. PATENT DOCUMENTS

| | | | | |
|---|---|---|---|---|
| 2,559,821 | A * | 7/1951 | Kagan | B60H 1/00014 62/331 |
| 5,246,778 | A * | 9/1993 | Costemalle | F16L 11/04 524/576 |
| 5,299,329 | A * | 4/1994 | Constantini | F24D 17/0005 4/597 |
| 8,056,617 | B2 | 11/2011 | Klassen et al. | |
| 8,151,753 | B2 * | 4/2012 | Kamiyama | F24H 1/009 123/142.5 R |
| 8,849,487 | B2 | 9/2014 | Malone et al. | |
| 9,694,452 | B2 | 7/2017 | Karamanos | |
| 10,639,961 | B2 | 5/2020 | Wijaya et al. | |
| 2005/0167169 | A1 * | 8/2005 | Gering | B60H 1/08 237/12.3 B |
| 2016/0084197 | A1 * | 3/2016 | Davis | F02G 5/00 237/12.1 |
| 2016/0193966 | A1 * | 7/2016 | Lem | B60R 7/06 206/438 |
| 2017/0355245 | A1 * | 12/2017 | Bergweiler | B60H 1/00314 |
| 2022/0029182 | A1 * | 1/2022 | Li | B60L 58/33 |

\* cited by examiner

*Primary Examiner* — Marc E Norman
(74) *Attorney, Agent, or Firm* — Gregory Adams; Richard Wolf (57) ABSTRACT

One general aspect includes a combined thermal management system (100) including a vehicle thermal system (102), a coupler (112) and a controller (114). The vehicle thermal system is of a vehicle and is configured to provide thermal fluid for thermal management of a target system. The coupler is configured to provide attachment to and permit conveyance of the thermal fluid. The controller has one or more processors configured to control the amount and rate of the thermal fluid provided to the target system.

13 Claims, 6 Drawing Sheets

FIG. 6

MULTI-SPLIT HVAC SYSTEMS

FIELD

The field to which the disclosure generally relates to is heating, ventilation and air conditioning (HVAC) systems.

BACKGROUND

Heating, ventilation and air conditioning (HVAC) systems control environmental conditions for various applications and uses. These applications include environmental control for health conditions, industrial applications, factories, information systems, computer systems, electronics and the like.

Each HVAC system requires a variety of components such as compressors, condensers, burners, fans, refrigerant, evaporators and the like. These components and the system consume large amounts of power in various forms including, but not limited to, natural gas, electricity, gasoline, diesel fuel, other fossil fuels and the like. The power/fuel consumption is costly financially and environmentally in the form of carbon dioxide emissions, waste and the like.

What is needed are techniques to reduce power usage and emissions.

DETAILED DESCRIPTION

The following description of the variations is merely illustrative in nature and is in no way intended to limit the scope of the disclosure, its application, or uses. The description is presented herein solely for the purpose of illustrating the various embodiments of the disclosure and should not be construed as a limitation to the scope and applicability of the disclosure. In the summary of the disclosure and this detailed description, each numerical value should be read once as modified by the term "about" (unless already expressly so modified), and then read again as not so modified unless otherwise indicated in context. Also, in the summary of the disclosure and this detailed description, it should be understood that a value range listed or described as being useful, suitable, or the like, is intended that any and every value within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors had possession of the entire range and all points within the range.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of concepts according to the disclosure. This description should be read to include one or at least one and the singular also includes the plural unless otherwise stated.

The terminology and phraseology used herein is for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited.

Also, as used herein any references to "one embodiment" or "an embodiment" means that a particular element, feature, structure, or characteristic described in connection with the embodiment is included in at least one embodiment. The appearances of the phrase "in one embodiment" in various places in the specification are not necessarily referring to the same embodiment.

The foregoing description of the embodiments has been provided for purposes of illustration and description. Example embodiments are provided so that this disclosure will be sufficiently thorough, and will convey the scope to those who are skilled in the art. Numerous specific details are set forth such as examples of specific components, devices, and methods, to provide a thorough understanding of embodiments of the disclosure, but are not intended to be exhaustive or to limit the disclosure. It will be appreciated that it is within the scope of the disclosure that individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Also, in some example embodiments, well-known processes, well-known device structures, and well-known technologies are not described in detail. Further, it will be readily apparent to those of skill in the art that in the design, manufacture, and operation of apparatus to achieve that described in the disclosure, variations in apparatus design, construction, condition, erosion of components, gaps between components may present, for example.

Heating, ventilation and air conditioning (HVAC) systems control environmental conditions for various applications and uses. These applications include environmental control for health conditions, industrial applications, factories, information systems, computer systems, electronics and the like.

Each HVAC system requires a variety of components such as compressors, condensers, burners, fans, refrigerant, evaporators and the like. These components and the system consume large amounts of power in various forms including, but not limited to, natural gas, electricity, gasoline, diesel fuel, other fossil fuels and the like. The power/fuel consumption is costly financially and environmentally in the form of carbon dioxide emissions, waste and the like.

One or more embodiments are disclosed that mitigate fuel consumption, emissions and waste by combining or utilizing a vehicle system for multiple HVAC applications. A portable/vehicle HVAC and power system is combined/coupled to other applications including, but not limited to housing, storage containers, medical applications, recreation vehicles (RVs), and the like.

The one or more embodiments can make use of waste heat to heat rooms, supply of heat accumulators—hot water accumulators also vice versa if cold temperatures could prevail outside—in order to feed warmed medium/coolant back into a cold battery circuit, so that preconditioning would take place.

It is appreciated that the combined system can extend usage for houses, caravans, trailers, container offices etc. covering seasonal and temporary demand.

It is appreciated that the combined system can reduce redundancy as infrastructure can be used for multiple purposes (eco-friendly).

It is appreciated that the combined system can provide temperature controlled delivery boxes for drop-off and pick-up delivery (last mile solutions).

It is appreciated that the combined system can facilitate medical applications such as patient warming/cooling and semi-medical like rehab cooling units but also organ transport etc (aid system).

It is appreciated that the combined system can facilitate animal carrier for warming/cooling space, parts, fodder, body etc (transport solution).

It is appreciated that the combined system can facilitate carriage of temperature sensitive products from food to construction material (temporary storage and transport).

It is appreciated that the combined system can utilize Fuel Cells to increase the energy conversion efficiency as the waste heat can be transmitted into a thermal energy storage (TES).

Figure 1:
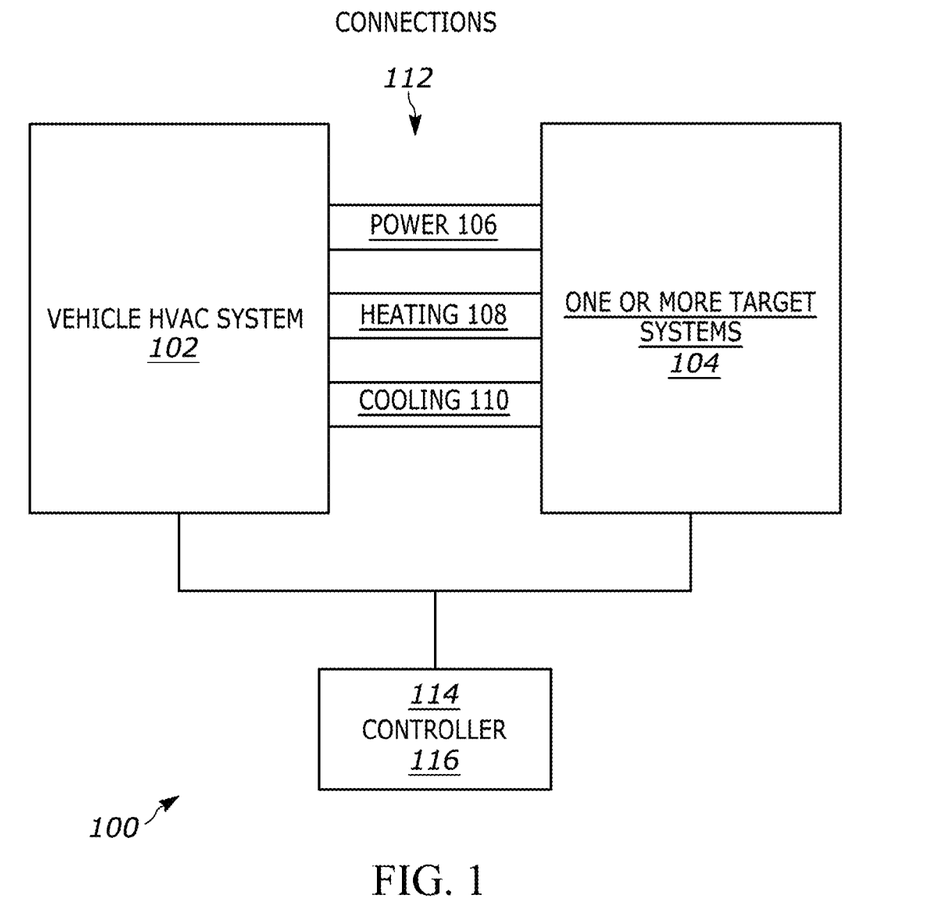
FIG. 1 is a diagram illustrating a portable combined power and thermal management system 100 in accordance with one or more embodiments.

FIG. 1 is a diagram illustrating a portable combined power and thermal management system 100 in accordance with one or more embodiments. The combined system 100 is provided for illustrative purposes and it is appreciated that suitable variations are contemplated.

The combined system 100 includes a vehicle HVAC and power system 102 and one or more target systems 104.

The target systems 104 include storage units, houses, commercial space, medical facilities, tiny houses and the like.

The vehicle system 102 is part of a vehicle and the like. The vehicle system 102 typically includes and provides heating, cooling and power. In one example, the vehicle system includes heating and cooling systems of the vehicle.

The heat can be generated and shared/combined with the vehicle.

Additionally, the heat can be provided from other sources, such as a vehicle cooling system.

Typically, the heating 108 and cooling 110 (thermal) is provided using one or more industrial hoses that transport fluid that conveys heating and/or cooling.

The power 106 can be provided in electrical form as alternating current, direct current and the like.

A connection or coupler 112 connects the vehicle system 102 to the one or more target systems 104. The coupler 112 can include a plurality of attachable connections.

The vehicle system 102 includes a controller 114 configured to control fluid rate, fluid amount and the like.

The target systems 104 include a controller 116 configured to interact with the controller 114. The controller 116 is configured to adjust/request thermal fluid rates based on target environmental settings, such as a target temperature.

This example describes a thermal system as the vehicle system 102. It is appreciated that the thermal system is not limited to vehicles and can include other devices including, but not limited to target systems. It is also appreciated that the system 100 can be configured with 2 or more thermal systems and/or 2 or more target systems in a mesh/network like arrangement. The system 100 can be scaled.

In another example, a robotic device can be used for the coupler 112, such as a wireless charging robot.

The system 100 can be used in fuel cell applications, where the waste heat of the fuel cell can be used to heat up a room of the target system 104. Typically, stack cooling of the fuel cell is also connected.

Figure 2:
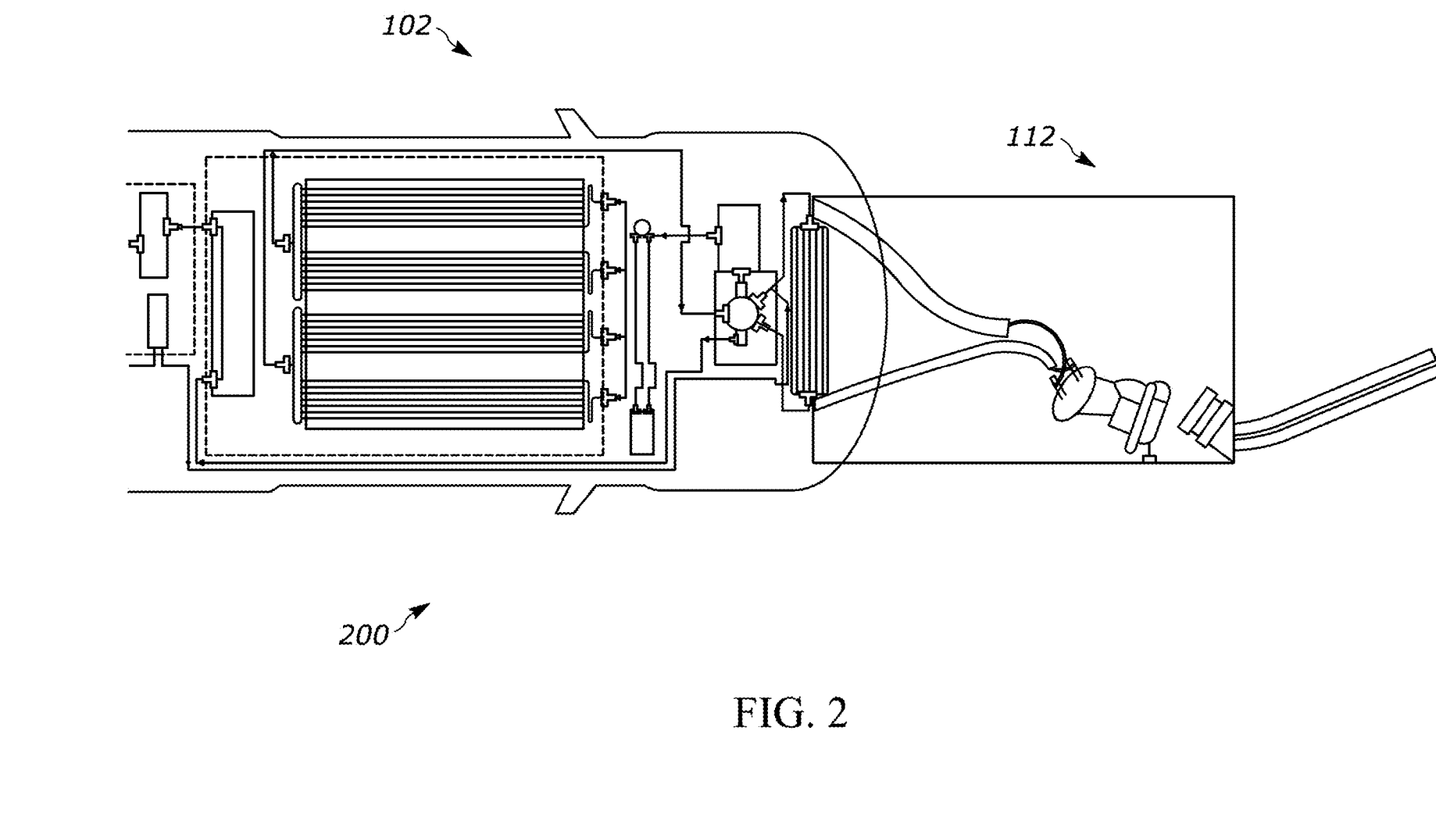
FIG. 2 is a drawing illustrating a portable combined power and thermal management system 200 in accordance with one or more embodiments.

FIG. 2 is a drawing illustrating a portable combined power and thermal management system 200 in accordance with one or more embodiments. The combined system 200 is provided for illustrative purposes and it is appreciated that suitable variations are contemplated.

The system 200 is an example of a suitable system 100.

The system 200 includes the vehicle system 102 and the coupler 112.

In this example, the system 200 includes a radiator, a battery pack, a chiller, a compressor (CR), and a power inverter/converter of a drive unit.

The drive unit receives a coolant fluid and provides a heated fluid.

The battery pack receives a coolant fluid and provides a heated fluid.

The radiator receive the heated fluid and generates the coolant fluid.

The chiller/compressor receives the heated fluid and generates the coolant fluid.

The coupler 112 is shown having an removable attachment for connection to one or more hoses for conveying coolant and heated fluid.

Figure 3:
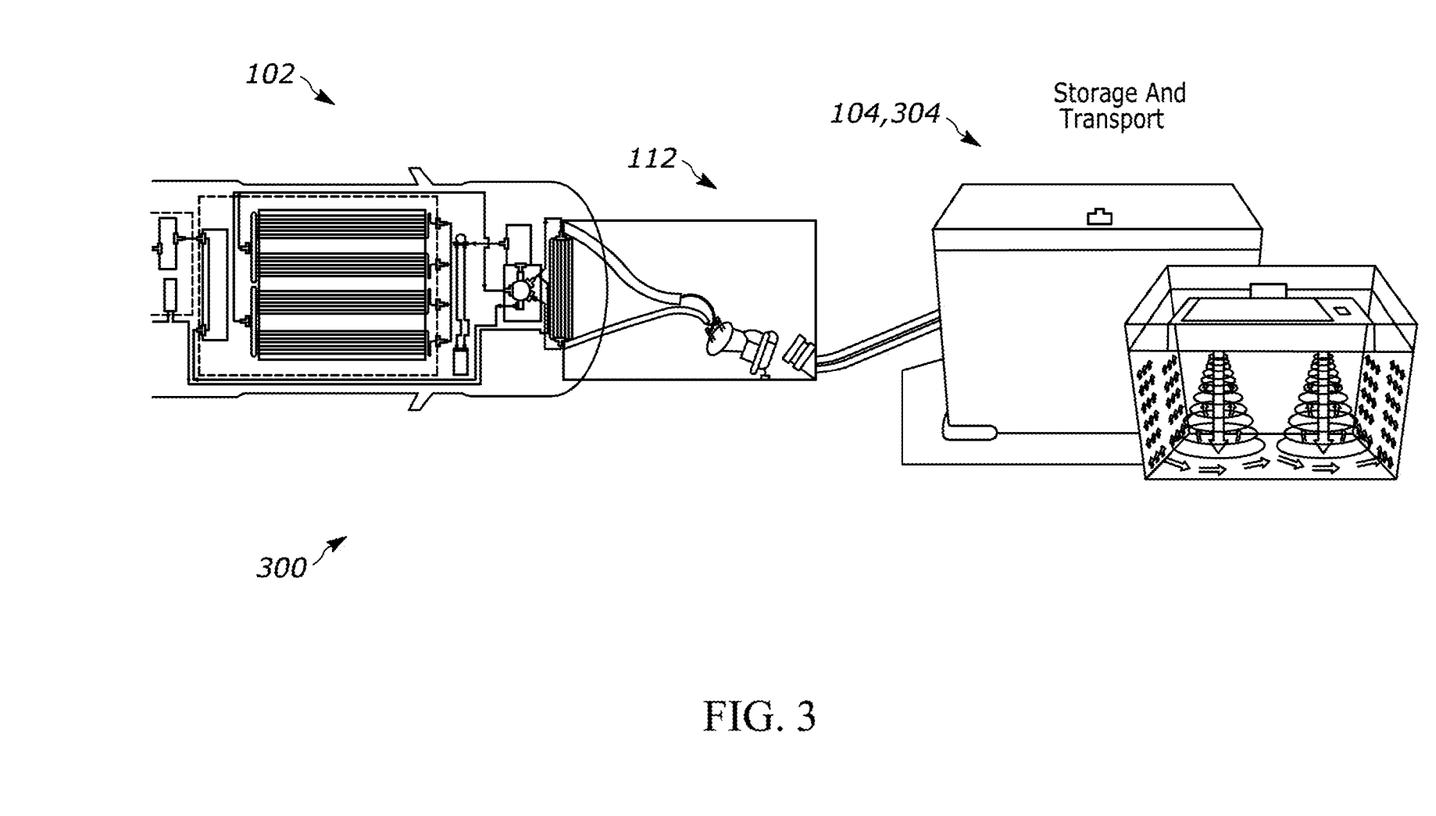
FIG. 3 is a drawing illustrating a portable combined power and thermal management system 300 for storage and transport in accordance with one or more embodiments.

FIG. 3 is a drawing illustrating a portable combined power and thermal management system 300 for storage and transport in accordance with one or more embodiments. The combined system 300 is provided for illustrative purposes and it is appreciated that suitable variations are contemplated.

The system 300 is an example of a suitable system 100.

The system 300 includes the vehicle system 102, the coupler 112 and a storage/transport container 304.

The container 304 is configured to thermally controlled based on attachment to the coupler 112.

Figure 4:
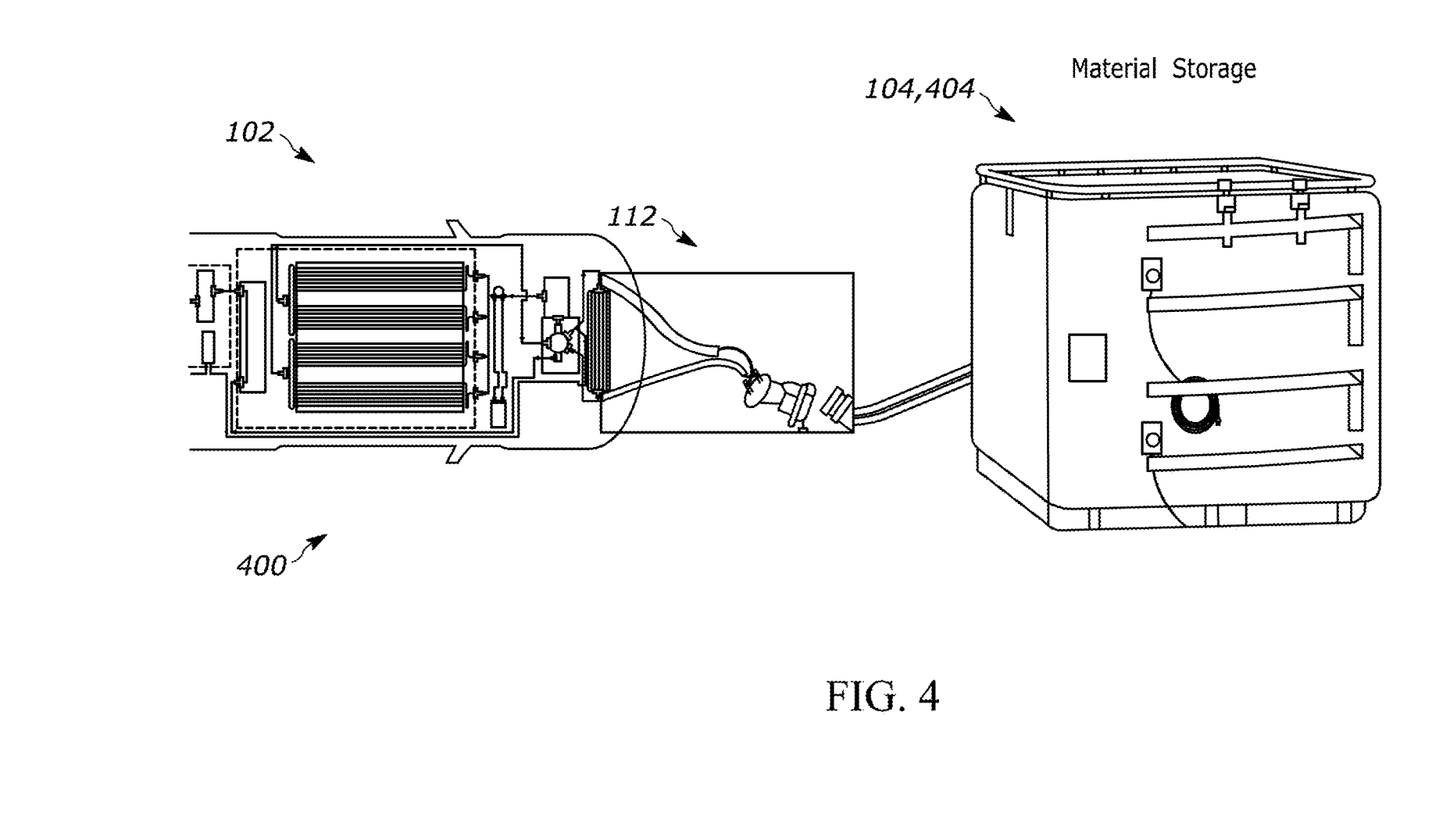
FIG. 4 is a drawing illustrating a portable combined power and thermal management system 400 for storage and transport in accordance with one or more embodiments.

FIG. 4 is a drawing illustrating a portable combined power and thermal management system 400 for storage and transport in accordance with one or more embodiments. The combined system 40 is provided for illustrative purposes and it is appreciated that suitable variations are contemplated.

The system 400 is an example of a suitable system 100.

The system 400 includes the vehicle system 102, the coupler 112 and a material storage container 404.

The container 404 is configured to thermally controlled based on attachment to the coupler 112.

The container 404 can be used for storage and/or transport of materials. In one example, the container 404 is used to store one or more rubber compounds.

Figure 5:
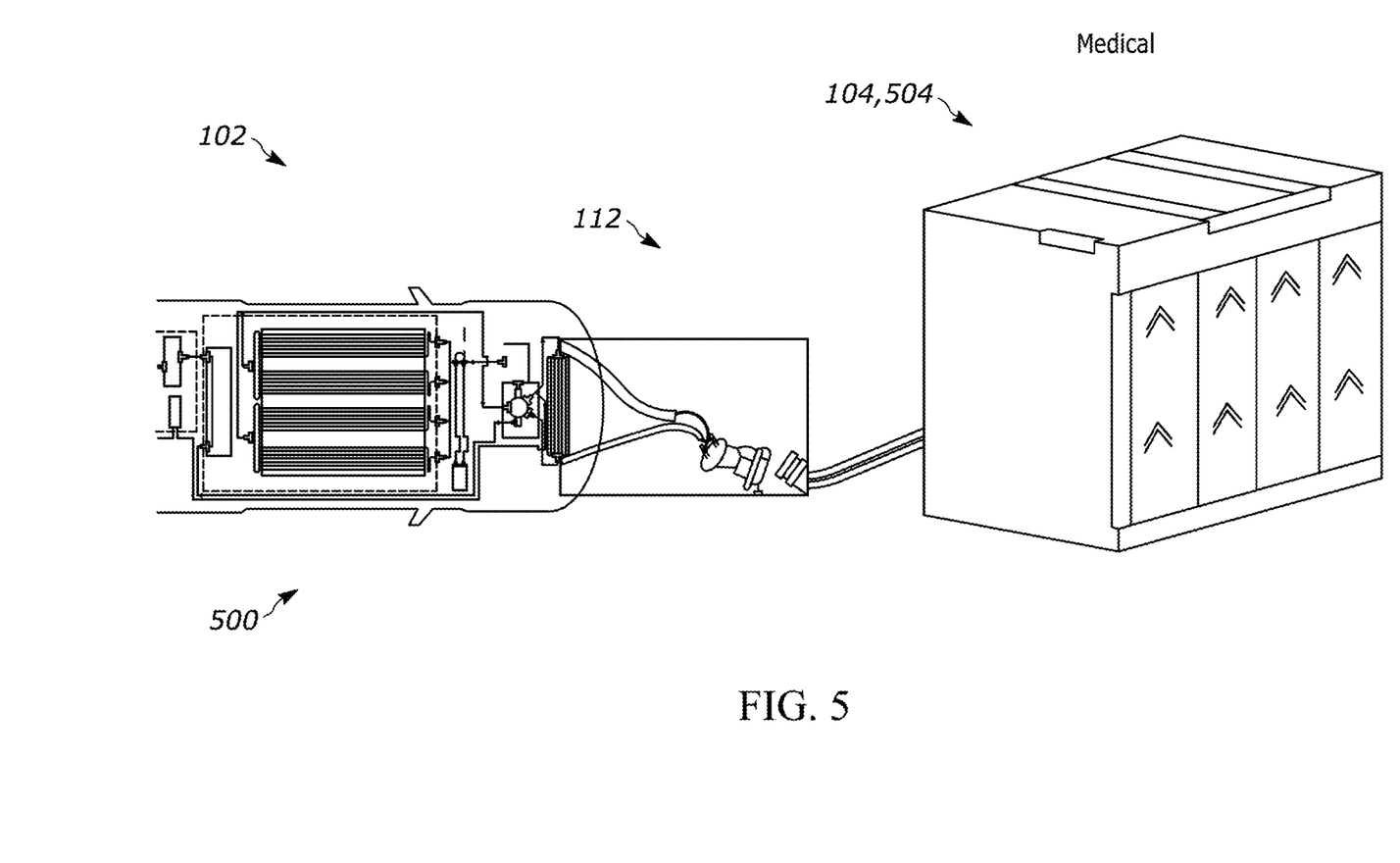
FIG. 5 is a drawing illustrating a portable combined power and thermal management system 500 for storage and transport in accordance with one or more embodiments.

FIG. 5 is a drawing illustrating a portable combined power and thermal management system 500 for storage and transport in accordance with one or more embodiments. The combined system 500 is provided for illustrative purposes and it is appreciated that suitable variations are contemplated.

The system 500 is an example of a suitable system 100.

The system 500 includes the vehicle system 102, the coupler 112 and a medical container 504.

The container 504 is configured to thermally controlled based on attachment to the coupler 112.

The container 504 can be used for storage and/or transport of materials. In one example, the container 504 is used to store medical supplies, such as human blood, human organs, vaccines, pharmaceuticals and the like.

Figure 6:
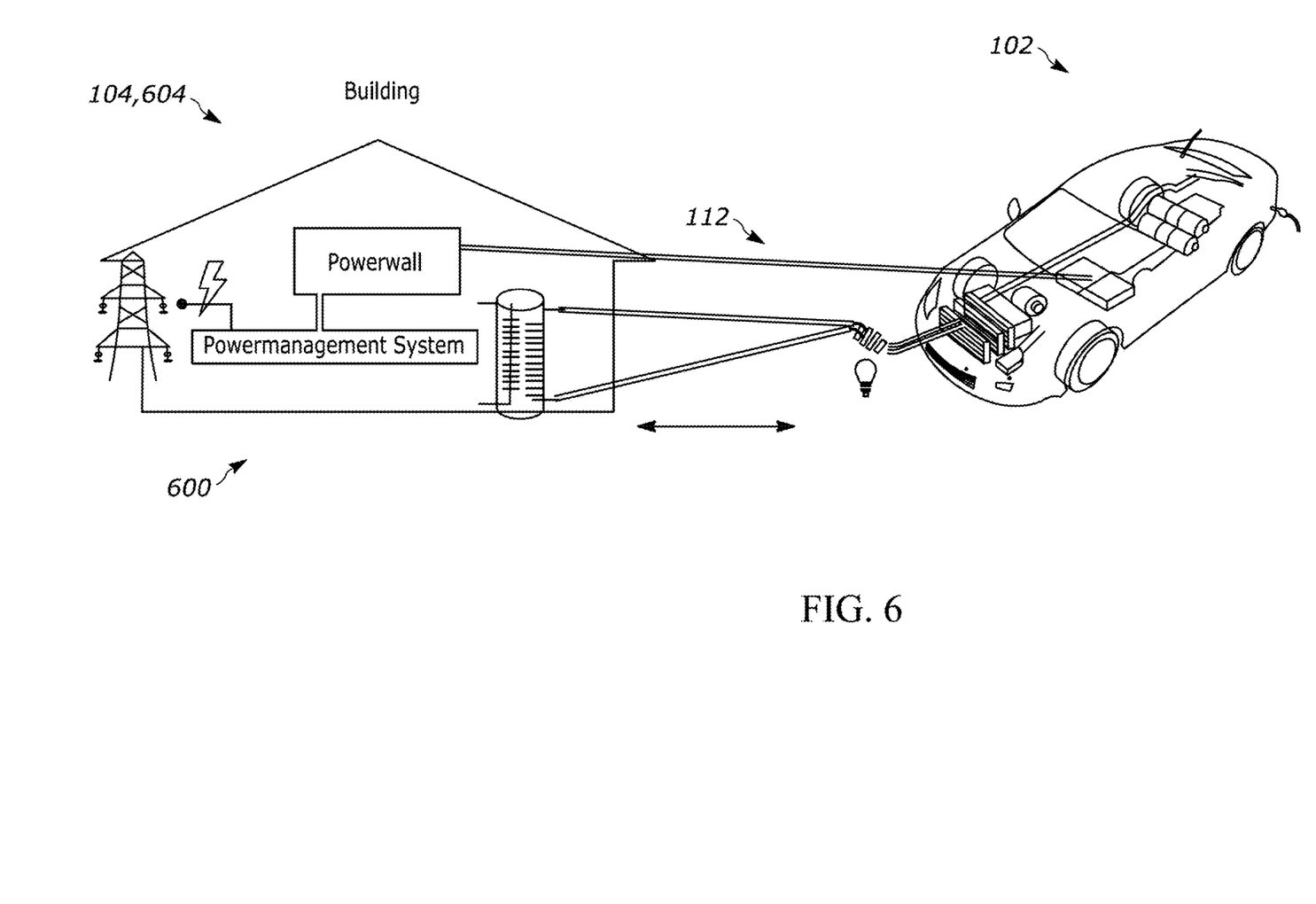
FIG. 6 is a drawing illustrating a portable combined power and thermal management system 600 for a building

FIG. 6 is a drawing illustrating a portable combined power and thermal management system 600 for a building in accordance with one or more embodiments. The combined system 500 is provided for illustrative purposes and it is appreciated that suitable variations are contemplated.

The system 600 is an example of a suitable system 100.

The system 600 includes the vehicle system 102, the coupler 112 and a building 604.

The building 604 can include its own thermal and power management system and can be coupled to one or more power sources, such as mains power.

The vehicle system 102 can supplement and/or replace the one or more power sources, such as in the event of a power outage.

One general aspect includes a combined thermal system (100). The combined thermal system also includes a vehicle thermal system (102) of a vehicle and configured to provide thermal fluid for thermal management of a target system (102). The system also includes a coupler (112) configured to provide attachment to and permit conveyance of the thermal fluid. The system also includes a controller (114) having one or more processors configured to control the amount and rate of the thermal fluid provided to the target system. Other embodiments of this aspect include corresponding computer systems, apparatus, and computer programs recorded on one or more computer storage devices, each configured to perform the actions of the methods.

Implementations may include one or more of the following features. The system the coupler having a power connection, a heating connection and a cooling connection. The vehicle thermal system may include a power system configured to controllably provide power via the coupler. The system may include coolant hoses configured to convey coolant fluid to the coupler. The system may include heat hoses configured to convey heating fluid to the coupler. The vehicle may include a battery pack that generates heat that is conveyed by the heating fluid. The vehicle may include a fuel cell that generates heat conveyed by the heating fluid. The coupler configured to releasably attach one or more conveying hoses of the target system. The one or more hoses may include of an elastomeric material. The system the target system is a storage container. The target system is a building. The target system is a medical container. The controller adjusts the rate of thermal fluid provided based on information from the target system. The thermal fluid may include one or more of water glycol and ac refrigerants. The system configured to operate as bidirectional where the target system is additionally configured to operate as a second thermal system and the vehicle thermal system is configured to operate as a second target system. The system may include a charging robot configured to interface between the thermal system and the target system. Implementations of the described techniques may include hardware, a method or process, or computer software on a computer-accessible medium.

It should be added that 'having' does not exclude other elements or steps and 'one' or 'one' does not exclude a multitude. It should also be noted that characteristics described with reference to one of the above examples of execution can also be used in combination with other characteristics of other examples of execution described above. Reference signs in the claims are not to be regarded as a restriction.

Various illustrative logics, logical blocks, modules, and circuits described in connection with aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration. Additionally, at least one processor can comprise one or more modules operable to perform one or more of the s and/or actions described herein.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product can include a computer readable medium having one or more instructions or codes operable to cause a computer to perform functions described herein.

Further, the actions of a method or algorithm described in connection with aspects disclosed herein can be embodied directly in hardware, in a software module executed by a processor, or a combination thereof. A software module can reside in RAM memory, flash memory, ROM memory, EPROM memory, EEPROM memory, registers, a hard disk, a removable disk, a CD-ROM, or any other form of storage medium known in the art. An exemplary storage medium can be coupled to processor, such that processor can read information from, and write information to, storage medium. In the alternative, storage medium can be integral to processor. Further, in some aspects, processor and storage medium can reside in an ASIC. Additionally, ASIC can reside in a user terminal. In the alternative, processor and storage medium can reside as discrete components in a user terminal. Additionally, in some aspects, the s and/or actions of a method or algorithm can reside as one or any combination or set of codes and/or instructions on a machine-readable medium and/or computer readable medium, which can be incorporated into a computer program product.

As it employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner", "adjacent", "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A combined thermal system comprising:
   a vehicle thermal system of a vehicle and configured to provide thermal fluid for thermal management of a first target system;
   a coupler configured to provide attachment to and permit conveyance of the thermal fluid;
   a controller having one or more processors configured to control the amount and rate of the thermal fluid provided to the first target system;
   the combined thermal system configured to operate as bidirectional where the target system is additionally configured to operate as a second thermal system and the vehicle thermal system is configured to operate as a second target system;
   coolant hoses configured to convey coolant fluid to the coupler;
   heat hoses configured to convey heating fluid to the coupler;
   a controller of the first target system configured to adjust thermal fluid rates of the thermal fluid from the vehicle thermal system based on target environmental settings including temperature;
   a power system to controllably provide power via the coupler; and
   a power connection, a heating connection and a cooling connection.

2. The system of claim 1, wherein the vehicle generates heat that is conveyed by the heating fluid.

3. The system of claim 1, wherein the coupler is configured to releasably attach one or more conveying hoses of the target system.

4. The system of claim 3, wherein the one or more hoses are comprised of an elastomeric material.

5. The system of claim 1, wherein target system is a storage container.

6. The system of claim 1, wherein the first target system is a building.

7. The system of claim 1, wherein the first target system is a medical container.

8. The system of claim 1, wherein the controller adjusts the rate of thermal fluid provided based on information from the target system.

9. The system of claim 1, the thermal fluid comprising one or more of water glycol and AC refrigerants.

10. A combined power and thermal management system comprising:
    a vehicle system that provides heating and cooling thermal fluids and power to
    a target system that requests the thermal fluids and thermal fluid rates from the vehicle system based on target environmental settings including temperature; and
    a coupler having removable attachments for connection of hoses between the vehicle system and the target system.

11. The system of claim 10, wherein the target system is a container for transport.

12. The system of claim 10, wherein the target system is a building.

13. The system of claim 10, wherein the target system is a second vehicle.

* * * * *